United States Patent Office 3,562,243
Patented Feb. 9, 1971

3,562,243
PROCESS FOR SEPARATION OF ROSIN ADDUCTS FROM MIXTURES WITH ROSIN
Paul H. Aldrich, Wilmington, Del., assignor to Hercules Incorporated, Wilmington, Del., a corporation of Delaware
No Drawing. Continuation of application Ser. No. 669,722, Sept. 22, 1967. This application Dec. 22, 1969, Ser. No. 883,682
Int. Cl. C09f 1/02
U.S. Cl. 260—111   5 Claims

ABSTRACT OF THE DISCLOSURE

A process for separation of all adducts of rosin from a mixture comprised of adducted rosin and non-adducted rosin is disclosed.

---

This case is a continuation of Ser. No. 669,722, filed Sept. 22, 1967, now abandoned.

This invention relates to a process for separation of adducts of rosin from a mixture comprised of adducted rosin and non-adducted rosin, said mixture being referred to hereinafter as crude rosin adduct. More particularly, this invention relates to a process for separation of adducts of rosin from a crude rosin adduct prepared by reaction of rosin with a material capable of forming an adduct with rosin, such for example, as an α,β-unsaturated monocarboxylic acid, an α,β-unsaturated polycarboxylic acid, and their available anhydrides.

Rosin is a solid resinous material obtained from oleoresin or stump wood of pine trees and contains chiefly resin acids, as well as smaller amounts of non-acidic compounds. The abietic type resin acids of rosin react with α,β-unsaturated mono- or polycarboxylic acids or their anhydrides such as fumaric acid, maleic acid, maleic anhydride and acrylic acid to form Diels-Alder adducts with the resin acids. For example, the major constituent formed in the reaction of rosin with fumaric acid is designated fumaropimaric acid (I).

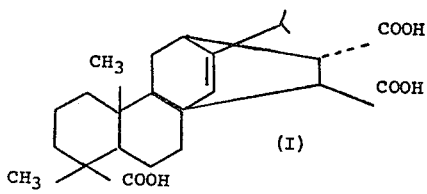

Fumaropimaric acid is also refered to in the art as levopimaric 6,14-endosuccinic acid. This crystaline tribasic acid when pure has a melting point of 275–276° C., specific rotation $[\alpha]_D^{25}$ +42.7°.

The major constituent formed in the reaction of rosin with acrylic acid is levopimaric 6,14-endopropionic acid (II), which has a specific rotation $[\alpha]_D^{25}$ +25.8°, and which can be represented by the following structural formula:

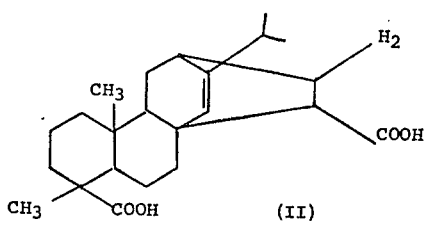

It is known that, during reaction of rosin with α,β-unsaturated mono- and polycarboxylic acids, stereoisomers of the predominate reaction products, which predominate reaction products are illustrated by Formulas I and II, are also formed. [See Journal of Organic Chemistry, 29 1017–1021 (1964).] It is further known that, during the course of reaction with rosin, the acid or anhydride utilized will react with the resin acids and neutrals present to form other adducts or addition products with rosin.

A process has been discovered whereby essentially all adducts formed by reaction of rosin with a material capable of forming an adduct with rosin such as α,β-unsaturated mono- or polycarboxylic acid or their anhydrides can be cheaply and efficiently separated from the non-adducted portion of the rosin. Thus, an increased recovery of all valuable rosin adducts useful in preparing coating compositions, inks, dyes, and plasticizers can be achieved by the process of this invention, simply and economically.

Broadly, in accordance with this invention, a mixture is prepared which contains crude rosin adduct, a polar liquid solvent, and a non-polar organic liquid solvent. The polar solvent and the non-polar solvent are either immiscible, one with the other, or are capable of being rendered immiscible by use with another liquid, such as water, as hereinafter described. The polar liquid solvent dissolves substantially all of the rosin adducts present in the mixture and the non-polar organic liquid solvent dissolves substantially all of the non-adducted rosin present in the mixture. The mixture is thus comprised of a polar phase comprised of the polar liquid solvent and rosin adducts, and a non-polar phase comprised of the non-polar organic liquid solvent and non-adducted rosin. The polar phase is recovered from the mixture and rosin adducts separated from the polar liquid solvent.

A preferred method of conducting the process of this invention consists of dissolving the crude rosin adduct in a polar liquid solvent to provide a first solution. To the first solution is added the non-polar organic liquid solvent to provide a mixture. This mixture is vigorously agitated. Owing to the fact that the solvents are substantially immiscible in each other, two phases will form, an upper or non-polar phase, and a lower or polar phase. The lower or polar phase is recovered, and rosin adducts are separated therefrom.

The polar phase containing rosin adducts can be extrated with additional quantities of non-polar solvent, if desired. The number of additional extractions will depend primarily on the purity desired of the recovered adducts. The adducted rosin component is subsequently recovered. This can be accomplished easil and readily by heating the polar phase to a temperature sufficient to remove substantially all polar solvent leaving, as a residue, substantially all adducts of rosin. The rosin adduct recovered is a lumpy material. This material can be ground with water in a high shear mixer such as a Waring Blendor and then filtered and dried under vacuum to obtain a granular product. An alternative method for obtaining granular adduct is to dissolve the separated and stripped rosin adducts in methanol to provide a solution and to then pour the solution into a large excess of water containing about .03% hydrochloric acid. A granular product is produced which can then be recovered by filtration.

Polar liquids suitable for use in this invention must dissolve substantially all of the rosin adducts from the crude rosin adduct. These solvents must also be substantially immiscible or capable of being rendered substantially immiscible with the non-polar solvents as by addition of water to the polar solvent; by a change in temperature of the polar, non-polar solvent, crude rosin adduct mixture; or by adjustment of proportions of the polar and non-polar solvents at a particular temperature.

Polar liquid solvents which are immiscible with the non-polar solvents or capable of being rendered immiscible with the non-polar solvents by addition of water to provide aqueous solutions are methanol, ethanol, propanol, isopropanol, formic acid, acetic acid, propionic acid, furfural, acetone, dioxane, ethylene glycol, propylene glycol, butylene glycol, glycerin, ethylene glycol mono-ethyl ether, ethylene glycol mono-methyl ether, ethylene glycol mono-acetate, diethylene glycol, diethylene glycol mono-ethyl ether, diethylene glycol mono-acetate, acetonitrile, nitromethane, dimethyl formamide and dimethyl phthalate. Of the above polar liquid solvents, those which are rendered immiscible with the non-polar solvents by addition of water are ethanol, propanol, isopropanol, acetic acid, propionic acid, acetone and dioxane.

Mixtures of two or more of the above solvents can be employed if desired. While not critical, suitable weight ratios of crude rosin adduct to solvent are from about 1:1 to about 1:5. The amount of water added to any particular polar liquid solvent will vary with the particular crude rosin reaction product, and the non-polar solvent to be employed, but will, in general, be from about 5% to about 40% by weight, based on the weight of the polar liquid solvent.

Non-polar organic liquid solvents which can be employed are solvents for non-adducted rosin and are substantially immiscible with the particular polar liquid solvent used. Suitable non-polar organic liquids include saturated and unsaturated liquid aliphatic hydrocarbons of from about 3 to about 17 carbon atoms, saturated cyclic hydrocarbons, turpentine, petroleum distillates with a boiling range of from about −45° C. to about 275° C., and carbon tetrachloride. Illustrative solvents include pentane; hexane; heptane; octane; nonane; decane; dodecane; tetradecane; hexadecane; 2-methyl pentane; 2,4-dimethyl pentane 2,2,3-trimethylbutane; 3-methyl, 5-ethyl octane; octene; decene; dodecene; tetradecene; cyclopentane; cyclohexane; the naphthenes; paramenthane cycloheptane; cyclooctane; α-pinene; β-pinene; gasoline (B.P. 40° C.–205° C.); kerosene (B.P. 175° C.–275° C.) and the like. Mixtures of two or more non-polar organic liquids can be employed, if desired. Suitable weight ratios of non-polar organic liquid solvents to crude rosin adduct are about 1:1 and higher.

In the preparation of rosin adducts to be separated by the process of this invention, any source of rosin will suffice. Thus, rosin as used herein is intended to embrace any of the usual types of rosin such as gum rosin, wood rosin, and tall oil rosin in the crude or refined state. Mixtures of the above rosins can be used if desired.

Illustrative of the materials capable of forming an adduct with rosin are α,β-unsaturated mono-carboxylic acids such as acrylic acid, methacrylic acid, crotonic acid; α,β-unsaturated polycarboxylic acids such as fumaric acid, maleic acid, citraconic acid, mesaconic acid, aconitic acid, itaconic acid; the available anhydrides of the above acids, such as maleic anhydride; alkyl esters of the above acids, wherein the alkyl group is methyl or ethyl such as methyl acrylate, ethyl acrylate, dimethyl fumarate, diethyl fumarate, methylethyl fumarate; β-propiolactone; acrylonitrile; acrylamide; and mixtures thereof.

The separation process of this invention is also adaptable to continuous operation. Thus, the first solution prepared by dissolving the crude rosin adduct in the polar liquid solvent is fed to the top of a multistage extraction column. The non-polar organic liquid is fed into the bottom of the column. The polar phase containing the rosin adducts is recovered as the bottoms product. The adducts are then separated as hereinabove described.

The temperature of operation of the process of this invention is not critical. The process can be operated from about 0° C. to the boiling point of the solvent mixture. The preferred temperature range is from about 20° C.–50° C.

The following examples are used to illustrate this invention. All parts and percentages are by weight unless otherwise specified.

The following example illustrates preparation of a crude rosin adduct by reaction of rosin with fumaric acid.

EXAMPLE 1

About 1100 parts of distilled N-wood rosin containing 53% abietic type acids are heated to 200° C. under a nitrogen atmosphere, and stirred while 210 parts of fumaric acid is added. The mixture is held at 200° C. for about one hour and then poured into a container and allowed to cool under nitrogen. The crude rosin adduct recovered contains 0.6% free fumaric acid, 4.2% anhydride calculated as maleopimaric acid, and 95.2% adducted and non-adducted rosin.

The following example illustrates separation of rosin fumaric acid adducts from its crude rosin adducts.

EXAMPLE 2

A first solution of crude rosin adduct is made by dissolving 250 parts of the crude rosin adduct of Example 1 in 396 parts of methanol. This first solution is mixed with 250 parts water and 340 parts of heptane in a separatory funnel. This mixture forms two phases after equilibrium is reached. The methanol-water (polar) phase containing the adducts is transferred to a second separatory funnel containing 340 parts of heptane to provide a mixture which is thoroughly agitated. After equilibration, the polar phase is transferred to a third separatory funnel containing 340 parts of heptane and the mixing repeated. The polar phase is recovered.

The three heptane phases are each extracted with a methanol-water solution containing 396 parts methanol and 250 parts water to effect removal of any adducts which may be remaining in the heptane phase. The methanol-water phases are then combined and evaporated to dryness. The adducts recovered after removal of methanol and water are ground in a Waring Blendor with water, filtered, washed with water and dried for 72 hours at 110° C. and at 15 mm. Hg. There are obtained 131 parts of rosin-fumaric acid adducts. The rosin-fumaric acid adducts recovered contain only 0.84% of non-adducted rosin which is comprised of 0.70% unreacted resin acids and 0.14% free fumaric acid.

The following example illustrates preparation of a crude rosin adduct by reaction of rosin with maleic anhydride.

EXAMPLE 3

About 250 parts of N-wood rosin containing 53% abietic type acids and 200 parts of maleic anhydride are admixed with 879 parts of benzene forming a solution in benzene. The benzene solution is then refluxed and hydrogen chloride gas is sparged intermittently through the solution for 48 hours. Refluxing and hydrogen chloride gas sparging are carried out to provide a reaction mass comprised of benzene and crude rosin adduct. Benzene is subsequently removed under vacuum. The crude rosin adduct is dissolved in ether, washed with water to remove unreacted maleic anhydride and heated to remove ether and traces of water. The crude adduct composition is as follows:

|  | Percent |
|---|---|
| Free maleic anhydride | 3.3 |
| Adducted rosin | 58.9 |
| Non-adducted rosin | 37.8 |

The following example illustrates separation of rosin-maleic anhydride adducts from its crude rosin adduct.

EXAMPLE 4

A solution consisting of 65 parts of the crude rosin adduct prepared in Example 3 dissolved in 103 parts of methanol is added to a separatory funnel containing 102 parts of heptane and 21.5 parts of water to provide a mixture. After vigorous mixing, the mixture is allowed to come to equilibrium whereby two phases form, a methanol-water phase and a heptane phase. The methanol-water phase is separated and is extracted twice with 102 parts of heptane. The heptane phases are combined and extracted with a solution consisting of 103 parts methanol and 21.5 parts water. The methanol-water phases are combined and extracted five times with 102 parts of heptane and then evaporated to dryness. The separated adducts obtained are ground with water in a Waring Blendor, filtered and then dried at 122° C. under vacuum. There are obtained 37.3 parts of rosin-maleic anhydride adducts (96% recovery based on total adducts originally present). The rosin adducts have an average acid number of 278, an average saponification number of 417 and contain 1.9% non-adducted rosin.

By comparison, 50 parts of the crude adduct prepared in Example 3 are separated using the method taught in U.S. 2,628,266. There are recovered 24.2 parts of rosin-maleic anhydride adducts containing 0.3% non-adducted rosin (80.5% recovery based on total adduct present).

The following example illustrates the use of acetonitrile as the polar liquid solvent in the separation process of this invention.

EXAMPLE 5

A solution, consisting of 65 parts of the adduct prepared in Example 3 dissolved in 102 parts of acetonitrile, is added to a separatory funnel containing 102 parts heptane to provide a mixture which is agitated vigorously. After agitation is completed the mixture comes to equilibrium with the formation of an acetonitrile (polar) phase and a heptane (non-polar) phase. The acetonitrile phase is separated from the heptane phase and extracted twice with 102 parts heptane. The three heptane phases recovered are combined and extracted with 102 parts of acetonitrile. The acetonitrile phases are combined and extracted five additional times with 102 parts heptane, and then heated to remove all traces of acetonitrile. The separated adducts (residue) are ground with water in a Waring Blendor, filtered and dried at 145° C. under vacuum. There are obtained 38.7 parts of rosin adducts (97.8% recovery based on total adducts present). The rosin adducts have an average saponification number of 411 and contain 3.2% resin acids.

The following example illustrates preparation of a crude rosin adduct by reaction of rosin with acrylic acid.

EXAMPLE 6

About 500 parts of gum rosin containing 55% abietic type acids are heated to 170° C. and 0.5 part of hydroquinone is added followed by 100 parts of acrylic acid which is added over a 7-minute time interval to provide a mixture. The temperature of the mixture is raised to 225° C. and maintained at that temperature for four hours. The resulting reaction mass is cooled to 200° C. and subjected to vacuum (water aspirator) for 30 minutes to remove unreacted acrylic acid. The crude rosin adduct has an average acid number of 231, an average saponification number of 241, and contains about 42.5% of rosin-acrylic acid adducts.

The following example illustrates separation of rosin-acrylic acid adducts from the crude rosin adduct.

EXAMPLE 7

About 150 parts of the crude rosin adduct prepared in Example 6 is dissolved in 352 parts of methanol to provide a first solution. The first solution is added to a separatory funnel containing 110 parts water and 205 parts heptane to provide a mixture which is agitated. After agitation the mixture comes to equilibrium with the formation of an aqueous methanol (polar) phase and a heptane (non-polar) phase. The aqueous methanol phase is recovered and is washed twice with 205 parts of heptane. The 3 heptane phases are each washed with a mixture of 170 parts methanol and 55 parts water. The methanol phases are then combined and washed three times with 205 parts of heptane and evaporated to dryness. The residue is dissolved in a small amount of methanol and the resulting solution is poured into water. The rosin-acrylic acid adducts precipitate and are filtered and dried under vacuum at 110° C. About 63 parts of rosin-acrylic acid adducts are recovered (96% recovery based on the weight of adducts present). The rosin-acrylic acid adducts have an average acid number of 280 and an average saponification number of 293, and contain 2.9% non-adducted rosin.

The following example illustrates preparation of adducts formed by reaction of distilled wood rosin with β-propiolactone, and separation of the adducts using methanol as the polar liquid solvent.

EXAMPLE 8

About 1000 parts of distilled wood rosin containing 46% isomerizable abietic-type acids are heated to 225° C. One part of hydroquinone is added, and 200 parts of β-propiolactone are added over a 1.25 hour time interval. After the addition, the reaction mass is maintained at 225° C. for four hours. The remainder of the reaction is carried out as in Example 6. The crude rosin adduct prepared has an average acid number of 243 and an average saponification number of 258. The crude rosin adduct contains 47.5% by weight rosin-acrylic acid adducts.

The separation of the rosin-acrylic acid adducts according to the procedure of Example 7 is repeated. About 70.8 parts of rosin-acrylic acid adducts are recovered. The adducts have an average acid number of 289, an average saponification number of 308, and contain 2.3% non-adducted rosin.

The following example illustrates separation of the adducts of rosin with β-propiolactone using dimethyl formamide as the polar liquid solvent.

EXAMPLE 9

About 100 parts of the crude rosin adduct prepared in Example 8 are dissolved in 302 parts of dimethyl formamide. The crude rosin adduct solution is added to a separatory funnel containing 80 parts water and 274 parts heptane. After vigorous mixing two phases form, a dimethyl formamide-water phase and a heptane phase. The dimethyl formamide-water phase is recovered and is extracted four more times with 274 parts heptane. The combined dimethyl formamide-water phases are evaporated to dryness. The residue is dissolved in a small amount of dimethyl formamide and the resulting solution poured into water. Rosin-β-propiolactone adducts precipitate. The precipitate is dried at 110° C. under vacuum. The rosin-β-propiolactone adducts recovered contain 14% resin acids.

The following example illustrates separation of rosin-maleic anhydride adducts from its crude rosin adduct using gasoline as the non-polar organic solvent.

EXAMPLE 10

A solution consisting of 50 parts of the crude rosin adduct prepared in Example 3 dissolved in 100 parts of methanol is added to a separatory funnel containing 102 parts of gasoline (B.P. 40° C.–200° C.) and 20 parts of water to provide a mixture. After vigorous mixing the mixture is allowed to come to equilibrium whereby there is formed a methanol-water (polar) phase and a gasoline (non-polar) phase. The methanol-water phase is separated and is extracted twice with 100 parts of gasoline. The gasoline phases are combined and extracted with a solution consisting of 100 parts methanol and 20 parts water. The aqueous methanol phases are combined and extracted six times with 100 parts of gasoline and then evaporated to dryness. The separated adducts are ground with water in a Waring Blendor, filtered, and then dried at 122° C. under vacuum. Rosin adducts substantially free of non-adducted rosin are recovered.

The polar liquid solvent and non-polar organic liquid solvent must be maintained in the liquid state when operating the separation process heretofore described. It is generally preferred to employ solvents which are liquids at the operating temperature of the process. However, low boiling solvents such as propane, butane, or low boiling petroleum distillates such as liquefied petroleum gas can be used if desired. When employing low boiling solvents, the process must be operated at a pressure sufficient to maintain the solvents in the liquid state.

It is to be understood that the above specification is illustrative of the invention and not in limitation thereof.

What I claim and desire to protect by Letters Patent is:

1. A process for separation of adducts of rosin from a crude rosin adduct consisting essentially of adducted rosin and non-adducted rosin derived by reaction of rosin with a material capable of forming an adduct with rosin, said process comprising
   (a) preparing a mixture of said crude rosin adduct, a polar liquid solvent, and a non-polar organic liquid solvent, said polar liquid solvent and non-polar organic liquid solvent capable of immiscibility with each other, said polar liquid solvent being capable of dissolving substantially all of the rosin adducts, said non-polar liquid solvent capable of dissolving substantially all of the non-adducted rosin; whereby there is provided a polar phase comprised of rosin adducts and polar liquid solvent and a non-polar phase comprised of non-adducted rosin and non-polar organic liquid solvent,
   (b) recovering the polar phase, and
   (c) separating rosin adducts from the polar liquid solvent.

2. The process of claim 1 wherein the material capable of forming an adduct with rosin is a material selected from the group consisting of acrylic acid, methacrylic acid, crotonic acid, fumaric acid, maleic acid, citraconic acid, mesaconic acid, aconitic acid, itaconic acid, the anhydrides of the above acids, the lower alkyl esters of the above acids, β-propiolactone, acrylonitrile, acrylamide and mixtures thereof.

3. The process of claim 2 wherein the polar liquid solvent is a material selected from the group consisting of methanol, ethanol, propanol, isopropanol, formic acid, acetic acid, propionic acid, furfural, acetone, dioxane, ethylene glycol, propylene glycol, butylene glycol, glycerin, ethylene glycol monoethyl ether, ethylene glycol monomethyl ether, ethylene glycol mono-acetate, diethylene glycol, diethylene glycol mono-ethyl ether, diethylene glycol mono-acetate, acetonitrile, nitromethane, dimethyl formamide and dimethyl phthalate, and mixtures thereof.

4. The process of claim 2 wherein the non-polar solvent is a material selected from the group consisting of saturated and unsaturated aliphatic hydrocarbons of from about 3 to 17 carbon atoms, saturated cyclic hydrocarbons, turpentine, petroleum distillates having a boiling range of from about −45° C. to about 275° C., carbon tetrachloride, and mixtures thereof.

5. The process according to claim 1 wherein the mixture prepared in (a) consisting essentially of a crude rosin adduct, a polar liquid solvent and a non-polar organic liquid solvent is prepared by first dissolving the crude rosin adduct in the polar liquid solvent to provide a first solution, and admixing the non-polar organic liquid solvent with the first solution whereby there is provided a polar phase and a non-polar phase.

References Cited
UNITED STATES PATENTS

| | | | |
|---|---|---|---|
| 2,628,918 | 2/1953 | Wilson et al. | 260—101 |
| 2,684,300 | 7/1954 | Wilson et al. | 106—218 |
| 3,193,449 | 7/1965 | Aldrich et al. | 106—218 |
| 3,361,619 | 1/1968 | Aldrich | 260—97.5 |

M. J. WELSH, Primary Examiner

W. E. PARKER, Assistant Examiner

U.S. Cl. X.R.

106—218; 162—180; 260—32.4, 32.6, 33.6, 101, 468.5